United States Patent [19]

Otsuka et al.

[11] 4,138,904

[45] Feb. 13, 1979

[54] LINK DRIVE MECHANISM FOR MECHANICAL PRESSES

[75] Inventors: Tsuruo Otsuka, South Holland, Ill.; Jacob J. Zeilenga, Demotte, Ind.

[73] Assignee: Verson Allsteel Press Company, Chicago, Ill.

[21] Appl. No.: 817,205

[22] Filed: Jul. 20, 1977

[51] Int. Cl.[2] .......................... G05G 3/00; F16H 35/08; F16H 21/32; F16H 29/00

[52] U.S. Cl. ........................................ 74/570; 74/835; 74/40; 74/116

[58] Field of Search ............ 74/571 R, 571 L, 571 M, 74/570, 87, 40, 116, 835

[56] References Cited

U.S. PATENT DOCUMENTS

| | | | |
|---|---|---|---|
| 3,229,535 | 1/1966 | Bergmann | 74/38 |
| 3,795,168 | 3/1974 | Spachner et al. | 74/38 X |

*Primary Examiner*—Benjamin W. Wyche
*Assistant Examiner*—Randall L. Green
*Attorney, Agent, or Firm*—Wallenstein, Spangenberg, Hattis & Strampel

[57] ABSTRACT

A link drive mechanism for vertically moving the slide of a mechanical press comprises a power driven eccentric unit carried by a horizontal shaft arranged substantially vertically above the connecting means for the slide and having first and second adjacent eccentrics, a first eccentric strap carried by the first eccentric and extending downwardly therefrom and having first and second laterally arranged pivot connections, a first link pivotally connected between the first pivot connection and the connecting means for the slide, a second eccentric strap carried by the second eccentric and extending laterally therefrom, a substantially vertically extending fulcrum lever arranged laterally from the horizontal shaft and pivoted intermediate its ends and having one of its arms pivotally connected to the second eccentric strap, and a second link pivotally connected to the other arm of the fulcrum lever and to the second pivot connection of the first eccentric strap. The first eccentric provides primarily vertical movement to the first pivot connection of the first eccentric strap and the second eccentric provides primarily horizontal movement thereto to produce, during the work function performing portions of the downward working stroke of the slide, controlled slide positions, slide velocity and tonnage capacity of the press.

13 Claims, 11 Drawing Figures

DRIVE SHAFT ROTATION - DEGREES
DISPLACEMENT DIAGRAM

DRIVE SHAFT ROTATION - DEGREES
VELOCITY DIAGRAM

DISTANCE UP ON STROKE - INCHES
DRIVE CAPACITY DIAGRAM

LINK DRIVE MECHANISM FOR MECHANICAL PRESSES

The principal object of the invention is to provide an improved link drive mechanism for mechanical presses having a power driven drive shaft and a slide, which has superior advantages over conventional slider-crank presses, which produces, during the work function performing portions of the downward working stroke of the slide, controlled slide positions, slide velocity and tonnage capacity of the press. The slide velocity during the work performing functions of the slide is slowed down with respect to the rotation of the power driven shaft of a conventional mechanical press, resulting in maximum performance during the work performing portion of the working stroke of the slide, maximum work function of the press for minimum work or tonnage capacity of the press, and minimal noise generated by the press during the work performing function thereof. The improved link drive mechanism of this invention can be adapted and designed for various types of press work functions, as for example, blanking and punching functions where the work performing portion of the working stroke of the press occurs near the bottom of the stroke, and drawing, draw and ironing and extrusion sizing functions wherein the work performing portion of the working stroke of the press occurs at positions above the bottom of the stroke. Metal forming and metal working presses must generate high magnitude of force, and rigidity of the press frame and drive components with minimum deflection is an important factor in performance and reliability. The improved link drive mechanism of this invention provides maximum rigidity and minimum deflection for maximum performance and reliability.

Briefly, the link drive mechanism of this invention is utilized in a mechanical press having a bed, a crown and a slide vertically movable therebetween for performing a work function on a work piece supported by the bed and having a connecting means for vertically moving the slide. The link drive mechanism of this invention is located in the crown of the press and is connected to the connecting means of the slide for vertically moving the slide. The link drive mechanism includes a power driven eccentric unit carried by a horizontal shaft arranged substantially vertically above the connecting means of the slide and having a first eccentric arranged substantially vertically above the connecting means of the slide and a second eccentric adjacent thereto. A first eccentric strap carried by the first eccentric extends downwardly therefrom and has a first pivot connection and a second pivot connection laterally spaced from the first pivot connection. A first link is pivotally connected at one end thereof to the first pivot connection of the first eccentric strap and at the other end thereof to the connecting means of the slide. A second eccentric strap is carried by the second eccentric and extends laterally therefrom and has a pivot connection.

A substantially vertically extending fulcrum lever is arranged laterally from the horizontal shaft and is pivoted intermediate its ends on a stationary pivot and has one of its arms pivotally connected to the pivot connection of the second eccentric strap. A second link extends laterally and is pivotally connected at one end thereof to the other arm of the fulcrum lever and at the other end thereof to the second pivot connection of the first eccentric strap. The second eccentric, second eccentric strap, fulcrum lever and second link provide primarily horizontal movement to the first eccentric strap and the first pivot connection thereof and the first eccentric and first eccentric strap provide primarily vertical movement to the first pivot connection of the first eccentric strap. Since the first and second pivotal connections in the first eccentric strap are substantially laterally arranged below the first eccentric, the forces in the first eccentric strap between the first and second pivotal connections are substantially linear and direct and, hence, substantially no torque forces are involved. This link drive mechanism operates to substantially align the first pivot connection of the first eccentric strap with the horizontal shaft and the slide connecting means during the work function performing portions of the downward working stroke of the slide and to produce, during the work function performing portions of the downward working stroke of the slide, controlled slide positions, slide velocity and tonnage capacity of the press.

The positions of the eccentric unit and the pivot of the fulcrum lever, the throw of the first and second eccentrics and the angles thereof, the lengths of the first and second eccentric straps, the lengths of the arms of the fulcrum lever and the lengths of the first and second links control the slide positions, slide velocity and tonnage capacity of the press to provide rated tonnage capacity of the press to the workpiece at desired distances up from the dead bottom of the slide during the downward working stroke of the slide for producing desired work functions on the workpiece. The rated tonnage capacity of the press to the workpiece may be provided at a substantial distance up from the dead bottom of the slide during the downward working stroke of the slide for providing drawing, drawing and ironing and extrusion sizing functions and the like. Likewise, the rated tonnage capacity of the press to the workpiece can occur substantially adjacent the dead bottom of the slide during the downward working stroke of the slide to provide blanking and punching functions or the like.

The link drive mechanism may be a single geared, single drive mechanism or a multiple geared, multiple drive mechanism including, for example, a double geared, twin drive mechanism or a four geared, four point drive mechanism. Preferably, the power driven eccentric unit carried by the horizontal shaft is an integral, one piece unit including the first and second eccentrics and a drive gear so as to provide maximum rigidity and minimum deflection. The power driven eccentric unit may be keyed to the horizontal shaft which in turn may be journaled for rotation in the crown. The driving gear of the power driven eccentric unit may be driven through a pinion by a drive shaft and a power driven flywheel and clutch mechanism and a brake mechanism may be associated with the drive shaft for controlling the rotation of the same.

Various link drive mechanisms for mechanical presses have been proposed in the past, such as those disclosed in U.S. Pat. Nos. 3,229,535, 3,766,771 and 3,795,168, but such link drive mechanisms are considerably different from the link drive mechanism of the instant invention in construction, manner of operation and results obtained. As for example, in U.S. Pat. No. 3,229,535 which is directed to a linkage for a drawing press, a crank of a crankshaft of a press pivotally carries a crank lever having a downwardly extending arm which is connected by a knee joint to a link connected to the slide of the press and an upwardly extending arm which is connected by a link to an oscillating lever operated by a crank or a cam on the crankshaft of the press. Among other things, because the two arms of the crank lever are located on opposite sides of its pivotal connection to the press crankshaft, substantial torque forces are involved in the crank lever which provide for minimum rigidity and maximum deflection, as compared to maximum rigidity and minumum deflection in the link drive mechanism of the instant invention wherein the forces in the first eccentric strap are substantially linear and direct and wherein substantially no torque forces are involved therein.

Other objects of this invention reside in the details of construction of the link drive mechanism of this invention and in the cooperative relationships between the component parts thereof.

Further objects of this invention will become apparent to those skilled in the art upon reference to the accompanying specification, claims and drawings, in which:

Figure 1:
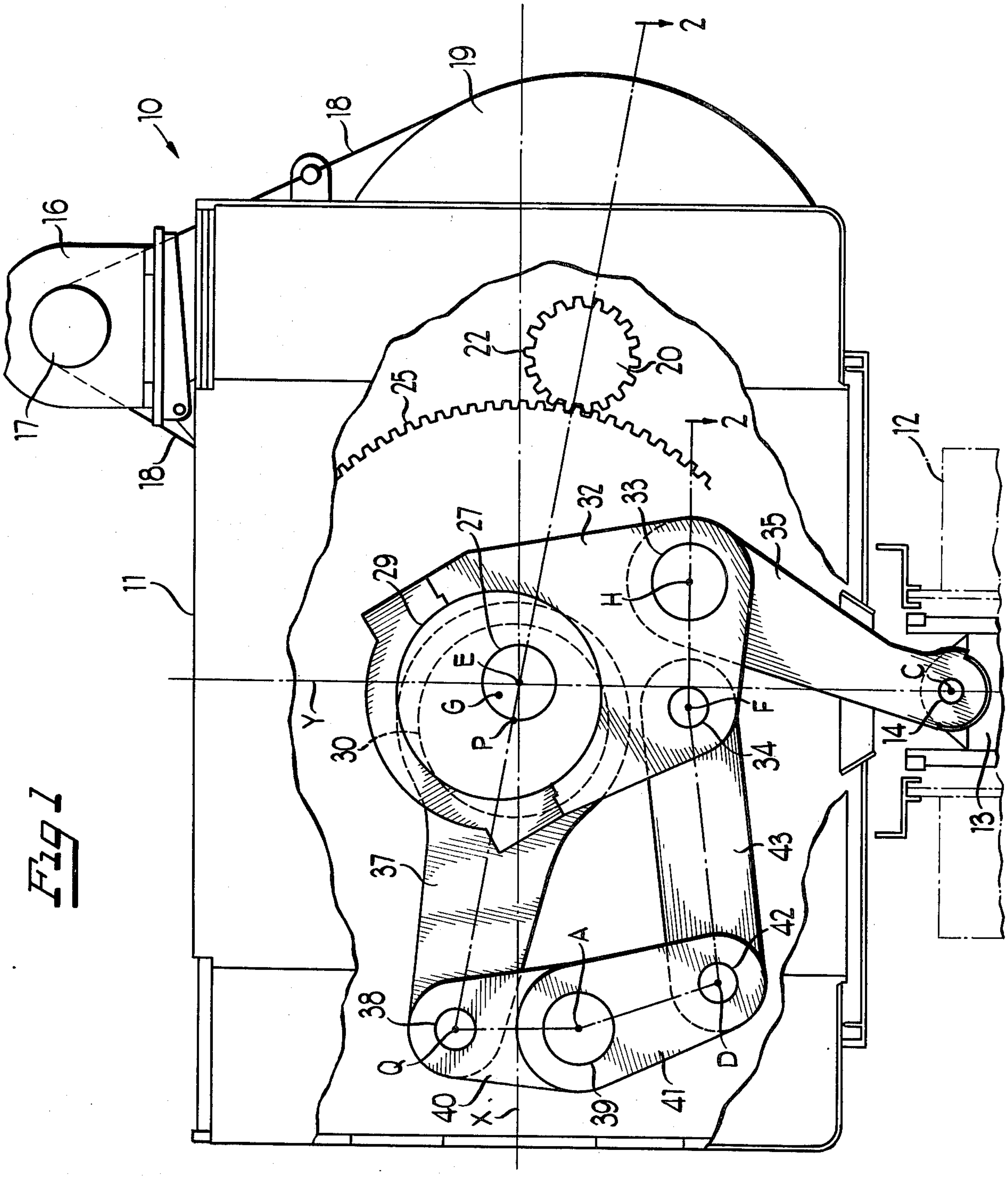
FIG. 1 is a diagrammatic side elevational view of one form of the link drive mechanism of this invention, which is illustrated as a single geared, single drive mechanism, looking from the right side of FIG. 2.
Figure 2:
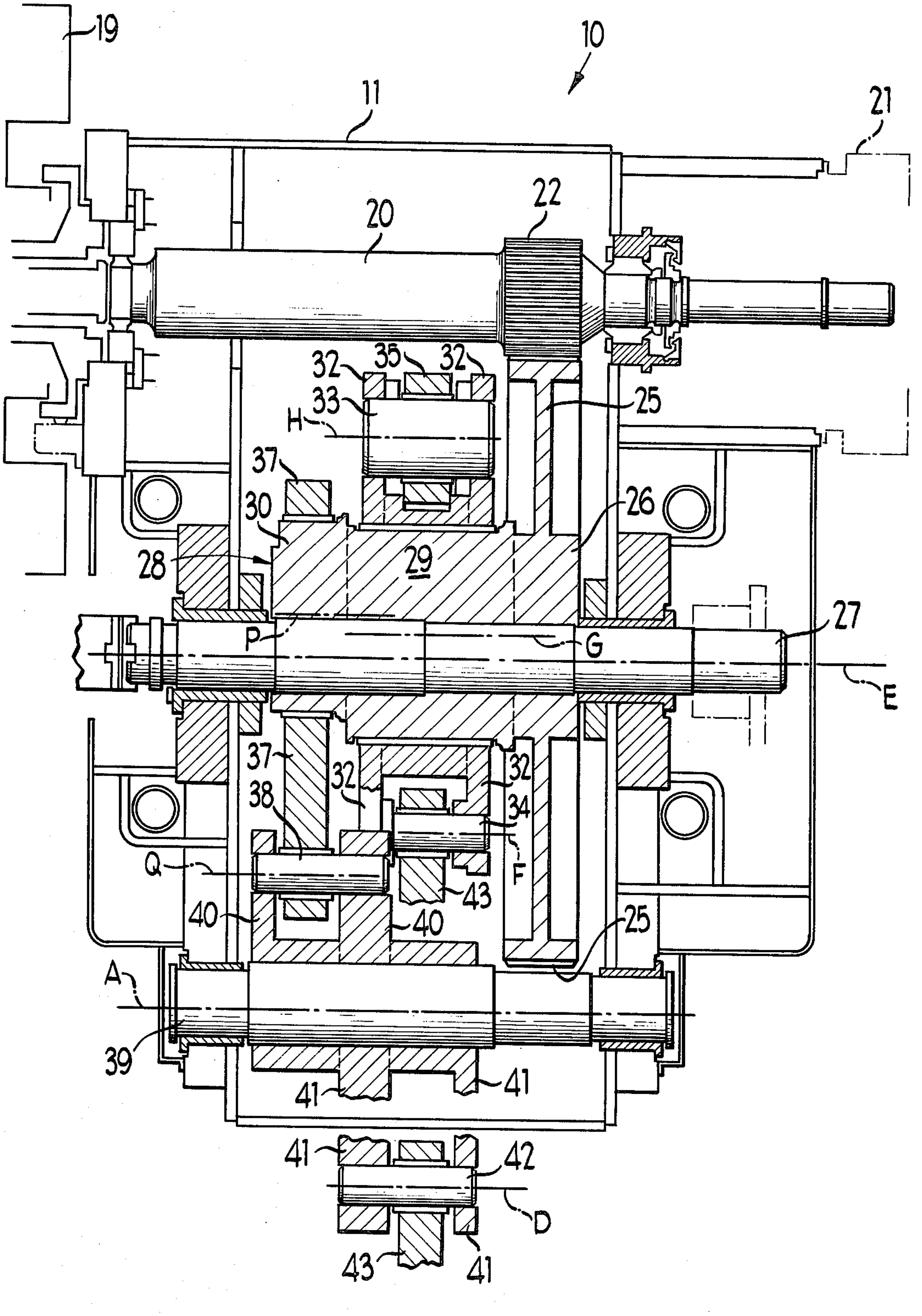
FIG. 2 is a broken and substantially horizontal sectional view of the link drive mechanism of FIG. 1 and taken substantially along the line 2—2 of FIG. 1.
Figure 3:
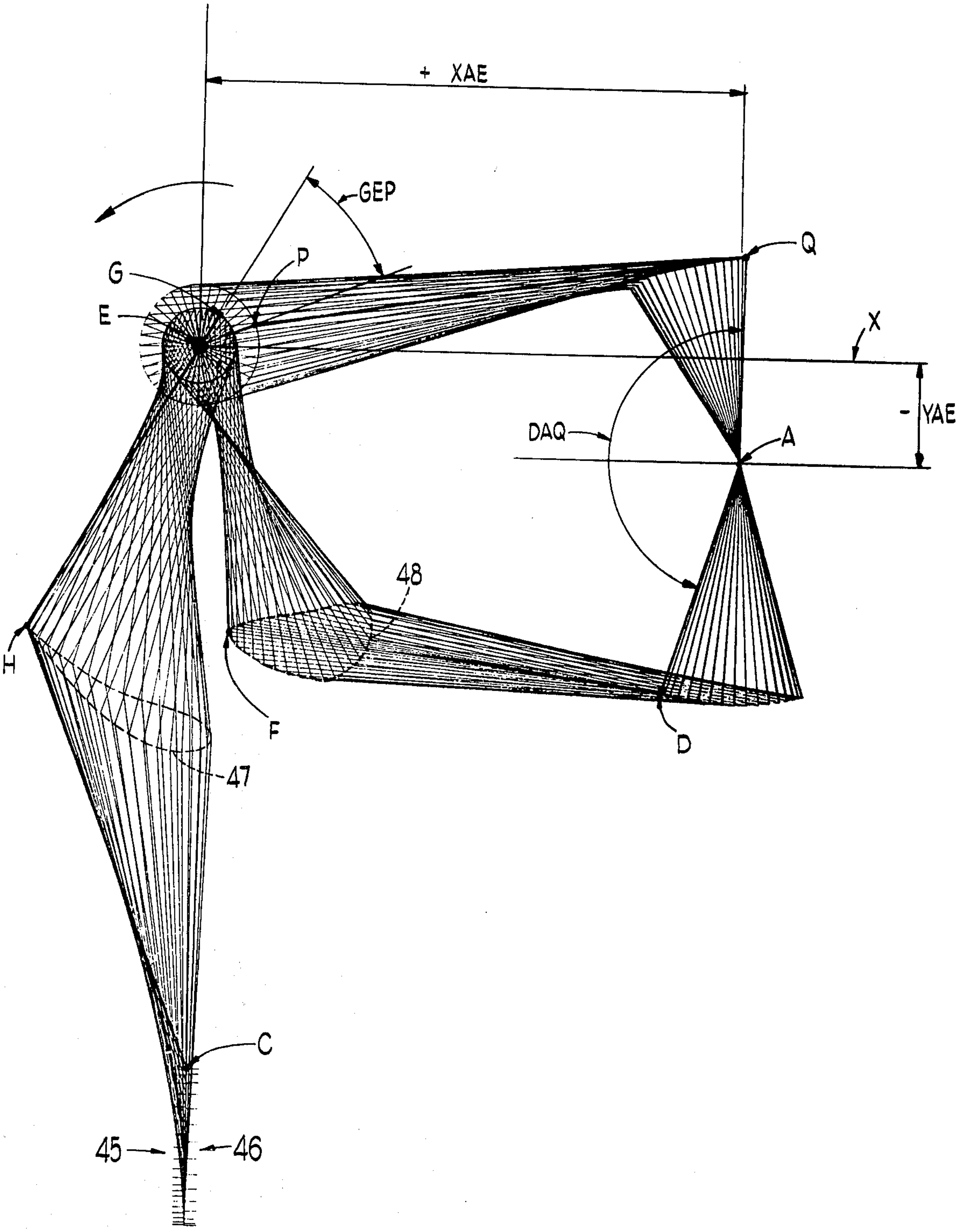
FIG. 3 is a computerized motion diagram of the link drive mechanism of FIGS. 1 and 2 and looking from the rear of FIG. 1 and the right of FIG. 2.
Figure 3A:
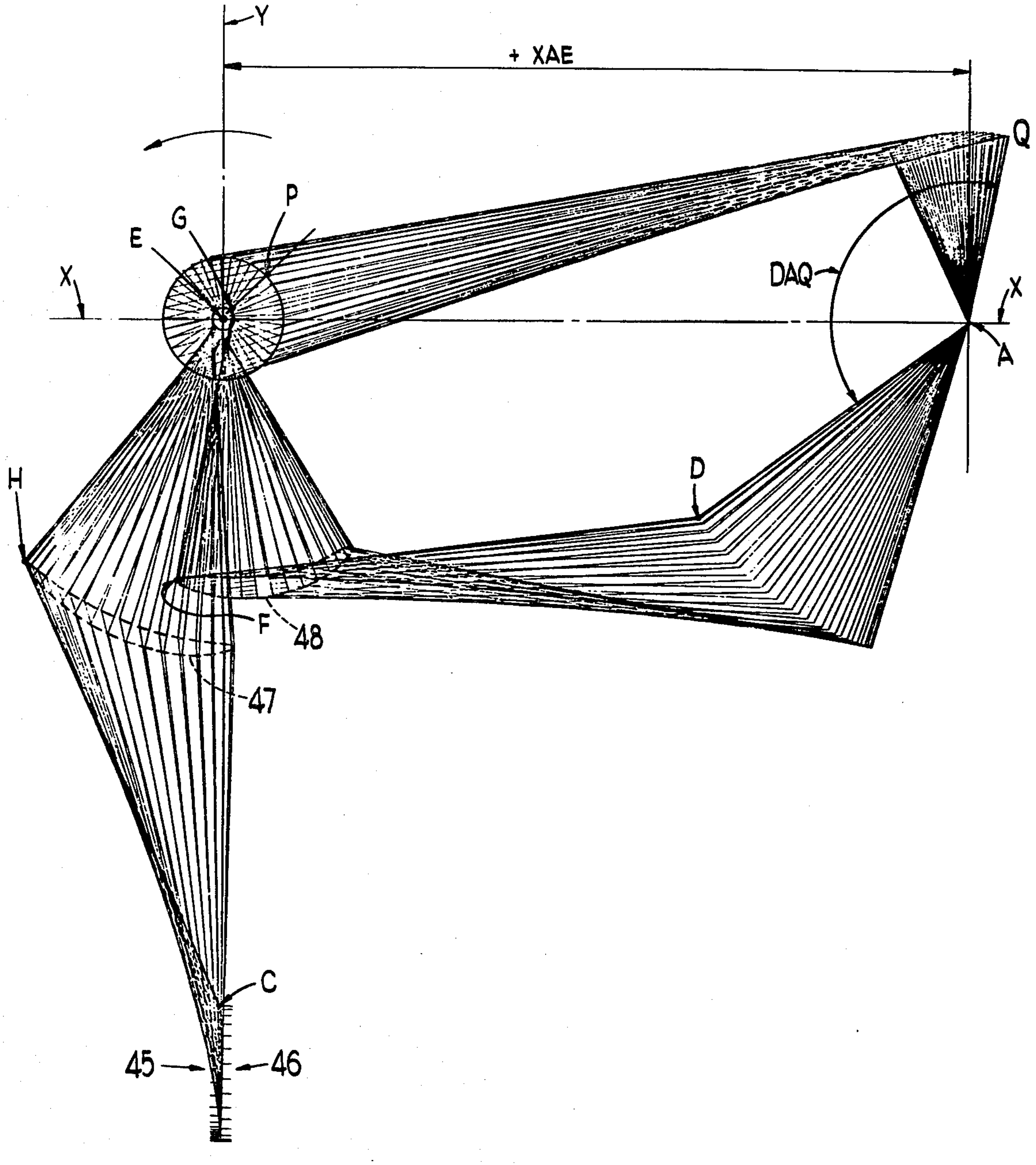
FIG. 3A is a computerized motion diagram similar to FIG. 3 but illustrating a modified link drive mechanism.
Figure 4:
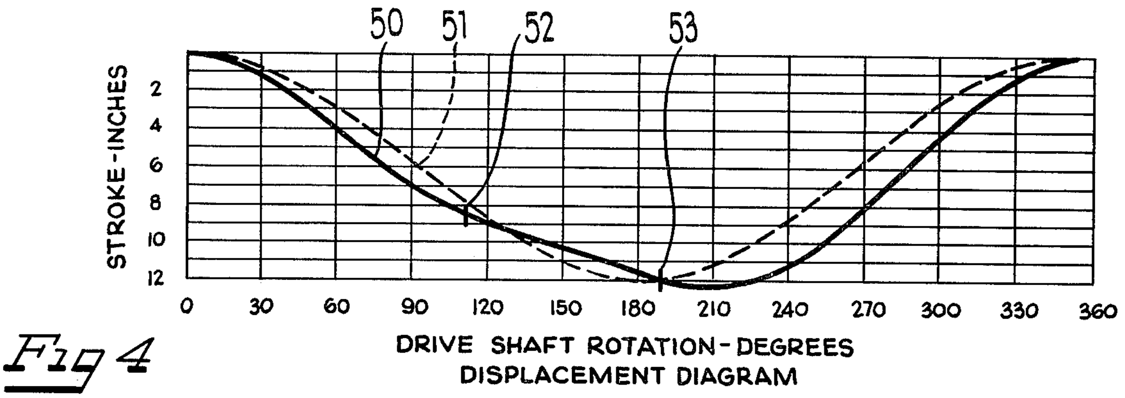
FIG. 4 is a displacement of the link drive mechanism of FIGS. 1-3, plotting slide stroke in inches against drive shaft rotation in degrees.
Figure 5:
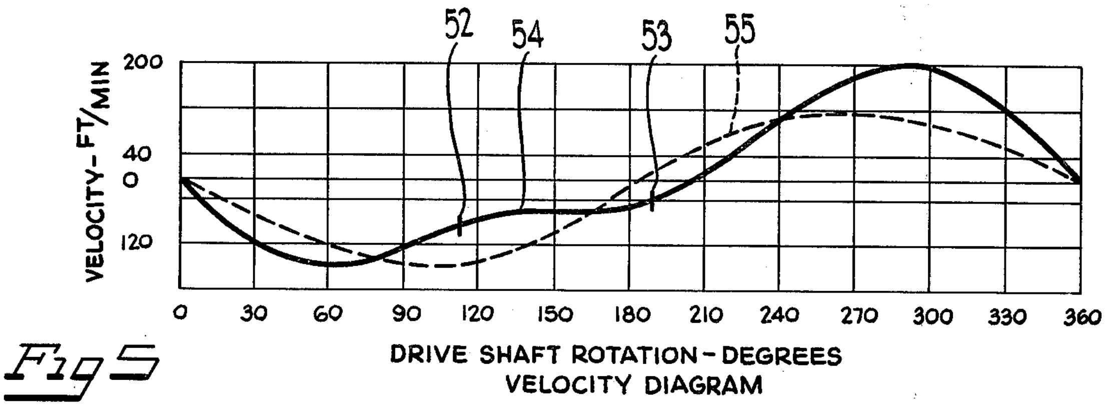
FIG. 5 is a velocity diagram of the link drive mechanism of FIGS. 1-3, plotting slide velocity in feet per minute against drive shaft rotation in degrees.
Figure 6:
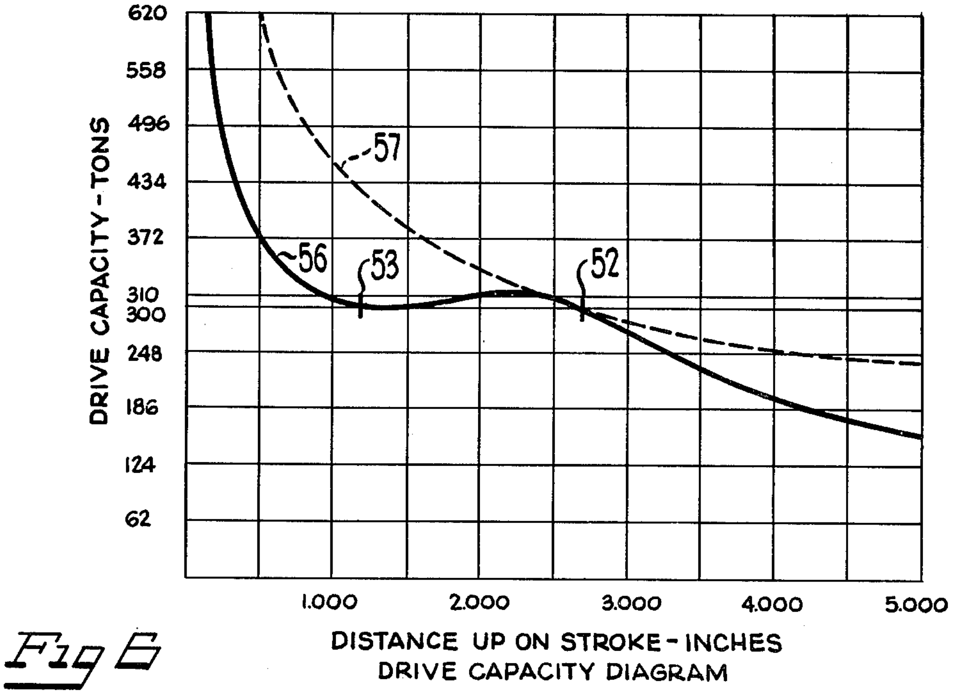
FIG. 6 is a drive capacity diagram of the link drive mechanism of FIGS. 1-3, plotting drive capacity in tons against distance up on stroke in inches.
Figure 7:
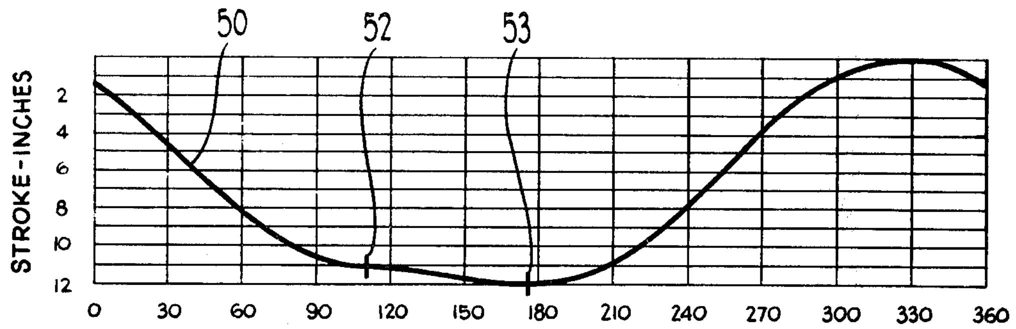
Figure 8:
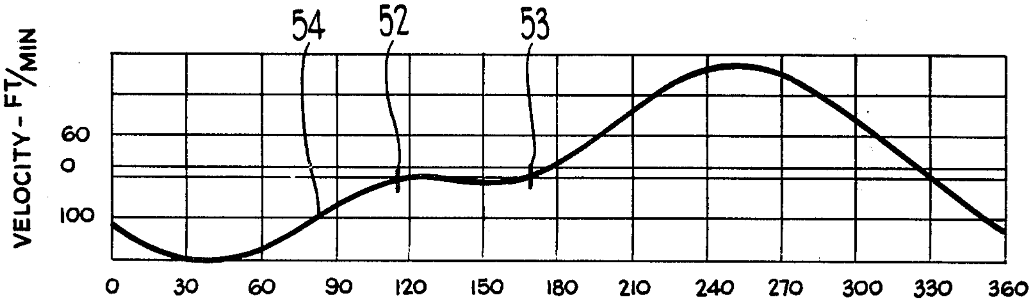
Figure 9:
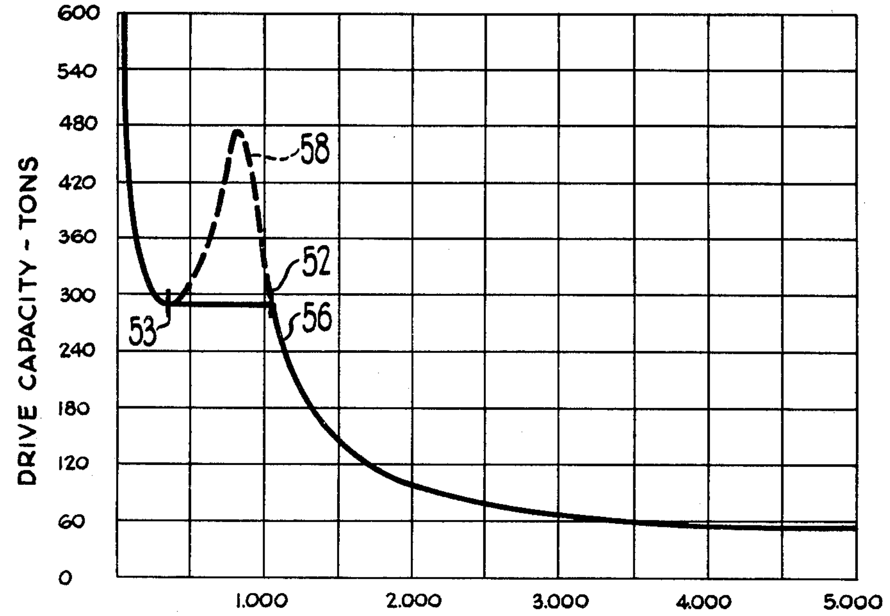

FIGS. 7, 8 and 9 are a displacement diagram, a velocity diagram and a drive capacity diagram corresponding to the diagrams of FIGS. 4, 5 and 6, but illustrating a form of the invention of FIGS. 1 and 2, modified in accordance with FIG. 3A.

Figure 10:
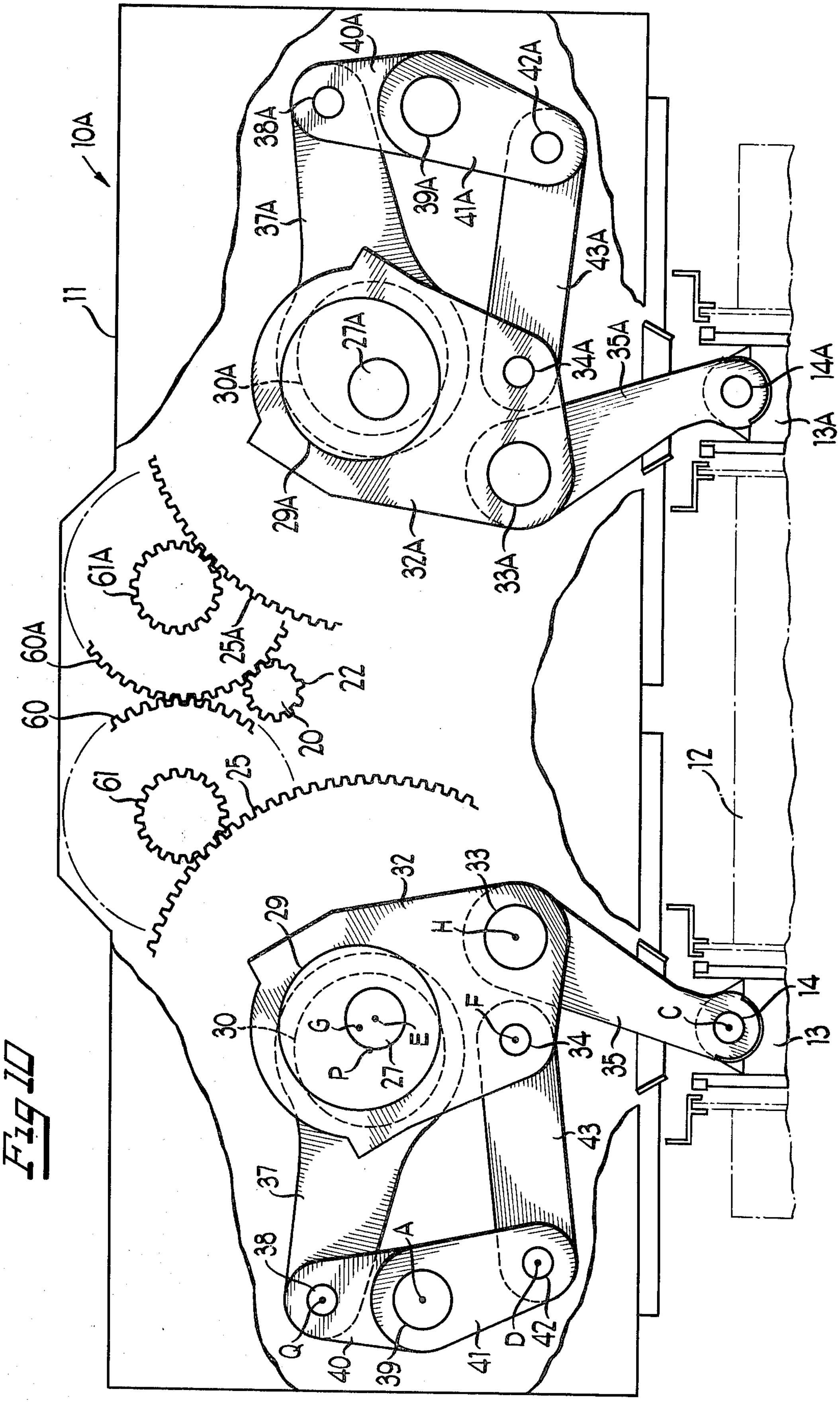

FIG. 10 is a diagramatic side elevational view similar to FIG. 1, but illustrating a further form of the link drive mechanism of this invention wherein the link drive mechanism comprises a multiple geared, multiple drive mechanism utilizing a plurality of link drive mechanisms.

One form of the link drive mechanism of this invention is generally designated at 10 in FIGS. 1 and 2, it being illustrated as a single geared, single drive mechanism. It is included in a crown 11 of a press which is supported by vertical columns from a bed, preferably having a bolster for supporting tooling for performing work functions on a workpiece. A slide 12 is mounted for vertical movement between the columns of the press and carries tooling also for performing work functions on the workpiece in conjunction with the tooling on the bolster. The slide 12 is provided with connecting means for vertically moving the slide and it may comprise a saddle 13 and a wrist pin 14 cooperating with the lower end of a link 35 which receives the wrist pin and engages the saddle. As the link 35 is moved, the slide 12 is raised and lowered. The saddle 13 and wrist pin 14 provide the connecting means having a center line C.

For driving the link drive mechanism, a motor 16 is carried by the crown 11 and is provided with a pulley 17 which is coursed by V-belts 18 also coursing a fly wheel 19 which is connected and disconnected from a drive shaft 20 by a suitable clutch. The drive shaft 20 is also provided with a brake 21. The brake 21 is applied for stopping rotation of the drive shaft 20 when the clutch to the fly wheel 19 is released and the fly wheel 19 drives the drive shaft 20 when its clutch is engaged and the brake 21 is released. Thus, the drive shaft 20 may be power driven through a working stroke cycle and a return stroke cycle for driving the link drive mechanism and stopped at the end of the return stroke cycle. This construction is generally known in the art and a further description is not considered necessary.

The drive shaft 20 is provided with a pinion 22 which meshes with a drive gear 25 provided with a hub 26 and forming a part of a power driven eccentric unit 28 carried by a horizontal shaft 27, the center line of which is designated E. Thus, the gear 25 rotates the power driven eccentric unit 28 about its axis E through a cycle of operation which is normally a 360° cycle of operation. The power driven eccentric unit, also includes a first eccentric 29 having a center axis G providing a throw equal to the distances between the center lines E and G, and a second eccentric 30 having a center line P providing a throw equal to the distance between the center lines E and P. The power driven eccentric unit 28 is preferably an integral unit including the gear 25 and hub 26, first eccentric 29 and second eccentric 30. The unit 28 may be a forged unit, a welded unit, or the like, the important point being that the driving torque is applied directly to the entire unit to provide maximum rigidity with minimum deflection. The power driven eccentric 28, carried by the shaft 27, is preferably keyed to the shaft with the shaft being rotatably mounted in bearings carried by the crown 11.

A first eccentric strap 32 is carried by the first eccentric 29 and it extends downwardly as illustrated in FIG. 1. This first eccentric strap 32 is preferably a welded unit and is bifurcated as indicated in FIG. 2 and it carries a pivot pin 33 which forms a first pivot connection having a center line H. The first eccentric strap 32 is also provided with a second pivot connection comprising a pivot pin 34 which is laterally arranged with respect to the pivot pin 33 and which has a center line F. The first link 35 which is connected to the wrist pin 14 of the connecting means C on the slide 12 is pivotally connected at its upper end to the pivot pin 33 carried by the first eccentric strap 32. The pivotal connection C on the slide 12 is arranged substantially vertically below the horizontal shaft 27 (E) and the first eccentric 29.

A second eccentric strap 37 is carried by the second eccentric 30 and it extends laterally from the horizontal shaft 27 and the second eccentric 30. At its outer end, the second eccentric strap receives a pivot pin 38 having a center line Q. A substantially vertically extending fulcrum lever 40-41 arranged laterally from the horizontal shaft 27 is carried by a shaft 39 which is rotatably mounted in the crown 11, the shaft 39 having a center line A and forming a stationary mounting for the fulcrum lever 40-41. As shown in FIG. 2, the fulcrum lever 40-41 is bifurcated, the upper bifurcated arm 40 thereof carrying the pivot pin 38, and the bifurcated lower arm 41 thereof carrying a pivot pin 42 having a center line D. The fulcrum lever 40-41 is preferably an integral unit wherein the bifurcated upper and lower arms are welded together so that the torque is applied directly to the entire unit to provide maximum rigidity with minimum deflection. One end of a second lever 43 is pivotally connected to the pivot pin 42 and the other end thereof is pivotally connected to the pivot pin 34 carried by the first eccentric strap 32. Since the first and second pivotal connection 33 and 34 in the first eccentric strap 32 are substantially laterally arranged below the eccentric 29, the forces in the first eccentric strap between the first and second pivotal connections are substantially linear and direct and, hence, substantially no torque forces are involved.

The computerized motion diagram of FIG. 3 illustrates the positions and motions of the various elements of the link drive mechanism of FIGS. 1 and 2. The points identified by letters in FIG. 3 correspond to the points and center lines of the elements in FIGS. 1 and 2 which are identified by the same letters therein. The X and Y axes in FIG. 3 cross at point E which is the center line of the eccentric unit 28 and the points G and F represent the centerlines of the first eccentric 29 and the second eccentric 30 and the throws thereof as they are rotated about the center line E.

Point G of the first eccentric 29 imparts motion to the first eccentric strap 32 and point P of the second eccentric 30 imparts motion to the second eccentric strap 37 which, in turn, imparts motion at point Q to the fulcrum lever 40–41, pivoted at point A, to impart motion to point D of the fulcrum lever. The second link 43 imparts motion from point D to the first eccentric strap 32 and the motions of points F and H on the first eccentric strap are depicted by the curves 48 and 47, respectively. Point H of the first eccentric strap 32 imparts motion to the first link 32 which, in turn, imparts vertical movement at point C to the press slide 12. Downward movement of point C of the slide during the power stroke is depicted by the slide position indications 45 and upward movement thereof on the return stroke is depicted by the slide position indications 46. Due to the curve 47 which is influenced by the curve 48, it is noted from the indications 45 that the velocity of the slide 12 with respect to the rotation of the eccentric unit 28 on its power stroke is appreciably slowed down at a point substantially above the dead bottom of the power stroke of the slide, i.e. substantially about 2½ inches above the dead bottom of the slide stroke which is substantially 12 inches. This arrangement is particularly useful for drawing, draw and ironing, extrusion sizing work functions and the like.

In the displacement diagram of FIG. 4 of the link drive mechanism of FIGS. 1 to 3, plotting slide stroke in inches against shaft rotation in degrees, solid curve 50 depicts the slide stroke of the link drive mechanism while the dotted curve 51 depicts the slide stroke of a conventional slider crank press. It is noted that the slope of the stroke or displacement curve 50 is fairly constant from about 120° to 190°, i.e. between points 52 and 53 on the curve, as compared to the curve 51. This is the zone in which the slide velocity of the link drive mechanism is much slower than in conventional slider crank presses.

In the velocity diagram of FIG. 5 of the link drive mechanism of FIGS. 1 to 3, plotting slide velocity in feet per minute against drive shaft rotation in degrees, solid curve 54 depicts the slide velocity of the link drive mechanism while the dotted curve 55 depicts the slide velocity of a conventional slider crank press. It is noted that between about 120° and 190°, i.e. between points 52 and 53 on the curve 54 the slide velocity is substantially constant as compared to the curve 55. This is the work function performing zone of the link drive mechanism and since the slide velocity is reduced and substantially constant in this zone, optimum work performing functions in this zone with minimum noise generation are provided.

The velocity at which the slide operated dies contact the work piece is reduced by the link drive mechanism of this invention. The contact point may be one third, one quarter or some other percentage of the slide stroke from bottom position. In the specific link drive mechanism of FIGS. 1 to 3, the reduction in slide velocity occurs through about the bottom 4 inches of the stroke and was developed to provide optimum reduction at 2.25 inches from the bottom. This is particularly suitable for operations such as draw, draw and iron, sizing extrusions and the like. Importantly, the slide velocity may be reduced to approximately one-half of the velocity of a conventional slider crank so that it is possible to double the speed or strokes per minute rate of the press. For the same SPM rate the reduced slide velocity of the link drive mechanism would result in much less impact noise generated from the tooling. The amount of reduction in slide velocity can be determined by the geometry of the link drive mechanism.

In the drive capacity diagram of FIG. 6 of the link drive mechanism of FIGS. 1 to 3, plotting drive capacity in tons against distance up on stroke in inches, solid curve 56 depicts the tonnage capacity of the link drive mechanism while the dotted curve 57 depicts the tonnage capacity of a conventional slider crank press. Here, the requirement is that the tonnage capacity requires 300 tons of force through the bottom 2.5 inches of the slide stroke. Standard rating of mechanical presses is expressed in tonnage capacity at a specified distance from bottom of the stroke and this distance is generally specified as ½ inch from bottom for general purpose straight side presses. It is noted that to meet the aforementioned requirement, 300 tons through the bottom 2.5 inches of the stroke, the dotted curve 57 for a conventional slider crank press indicates that such a press would require 600 tons at a distance of ½ inch from the bottom. This indicates that oversize slider crank drive is needed for this particular application. The dotted curve 57 for the conventional slider crank press has excess capacity below 2.5 inches from bottom. However, solid curve 56 for the link drive mechanism of this invention requires only a press of 300 ton capacity to provide 300 tons of force through the bottom 2.5 inches of the slide stroke, the 300 tons being applied between points 52 and 53 of the curve 56 and some excess tonnage being applied thereafter. Accordingly, by reason of the link drive mechanism of this invention, a press of only one-half the tonnage capacity of a conventional slider crank press is needed.

While the foregoing discussion with respect to FIGS. 1, 2, 3, 4, 5 and 6 of the link drive mechanism of this invention has been directed primarily to a mechanism wherein the working portion of the power stroke begins a substantial distance above the dead bottom of the stroke, the geometry of the link drive mechanism, i.e. the positions and dimensions of the elements, may be altered to begin the working portion of the power stroke nearer to the dead bottom of the stroke, as for example, for blanking and punching operations. Here, the work portion of the power stroke may begin, for example, about one inch above the dead bottom of the stroke. Such a modified arrangement of the link drive mechanism is illustrated in FIGS. 3A, 7, 8 and 9.

The computerized motion diagram of FIG. 3A of the modified link drive mechanism is like that of FIG. 3 except that the geometry, i.e. the positions and dimensions of the elements of the link drive mechanism, have been changed. As an example, the geometry has been changed in accordance with the following tabulation:

| Elements | Fig. 3 | Fig. 3A |
|---|---|---|
| (X)AE | 43.000" | 68.000" |
| (Y)AE | − 8.000 | 0.000 |
| (Y)CE | −56.000 | −62.000 |
| EP | 4.750 | 5.500 |
| EG | 3.000 | 1.000 |
| GH | 28.750 | 29.000 |
| FG | 24.750 | 24.000 |
| FH | 16.000 | 14.000 |
| CH | 36.500 | 43.000 |
| PQ | 39.250 | 68.000 |
| AQ | 16.000 | 17.000 |
| AD | 19.000 | 30.000 |
| DF | 34.500 | 48.000 |
| < GEX | 58.797775° | 53.168625° |
| < PEX | 10.472730° | 53.168625° |
| <GEP | 48.325044° | 0.00000° |
| <DAQ | 162.396480° | 137.396533° |

The computerized motion diagram of FIG. 3A illustrates the positions and motions of the various elements of the link drive mechanism of FIGS. 1 and 2 as modified or changed in accordance with the aforementioned tabulation, the points identified by letters in FIG. 3A corresponding to the points and center lines of the elements of the modified link drive mechanism of FIGS. 1 and 2 which are identified by the same letters therein. The X and Y axes in FIG. 3A cross at point E which is the center line of the eccentric unit 28 and the points G and P represent the center lines of the first eccentric 29 and the second eccentric 30, and the throws thereof as they are rotated about the center line E.

In FIG. 3A, as in FIG. 3, point G of the first eccentric 29 imparts motion to the first eccentric strap 32 and point P of the second eccentric 30 imparts motion to the second eccentric strap 37 which, in turn, imparts motion at point Q, to the fulcrum lever 40–41, pivoted at point A, to impart motion to point D of the fulcrum lever. The second link 43 imparts motion from point D to the first eccentric strap 32 and the motions of points F and H on the first eccentric strap are depicted by curves 48 and 47, respectively. Point H of the first eccentric strap 32 imparts motion to the first link 32 which, in turn, imparts vertical movement at point C to the press slide 12. Downward movement of point C of the slide during the power stroke is depicted by the slide position indications 45 and upward movement thereof on the return stroke is depicted by the slide position indications 46. By comparing FIG. 3A with FIG. 3 it is noted that the curves 48 and 47 have different configurations, these being brought about by the different and modified positions and dimensions of the elements of the link drive mechanism. Due to the curve 47 which is influenced by the curve 48, it is noted from the indications 45 in FIG. 3A that the velocity of the slide 12 with respect to the rotation of the eccentric unit 28 on its power stroke is appreciably slowed down at a point near the dead bottom of the power stroke of the slide, i.e. substantially about one inch above the daed bottom of the slide stroke which is substantially 12 inches. This modified arrangement is particularly useful for blanking and punching operations and the like.

In the displacement diagram of FIG. 7 of the modified link drive mechanism of FIGS. 1, 2 and 3A, plotting slide stroke in inches against shaft rotation in degrees, solid curves 50 depicts the slide stroke of the modified link drive mechanism. It is noted that the slope of the stroke or displacement curve 50 is fairly constant from about 120° to 170°, i.e. between points 52 and 53 on the curve. This is the zone in which the slide velocity of the modified link drive mechanism is much slower than in conventional slider crank presses.

In the velocity diagram of FIG. 8 of the modified link drive mechanism of FIGS. 1, 2 and 3A, plotting slide velocity in feet per minute against drive shaft rotation in degrees, solid curve 54 depicts the slide velocity of the modified link drive mechanism. It is noted that between about 120° and 170°, i.e. between points 52 and 53 on the curve 54 the slide velocity is substantially constant. This is the work function performing zone of the modified link drive mechanism and since the slide velocity is reduced and substantially constant in this zone, optimum work performing functions in this zone with minimum noise generation are provided.

The velocity at which slide operated dies contact the work piece is reduced by the modified link drive mechanism of this invention. In the specific modified link drive mechanism of FIGS. 1, 2 and 3A the reduction in slide velocity occurs through about the bottom one inch of the stroke and was developed to provide optimum reduction at one inch from the bottom. This is particularly suitable for operations such as blanking and punching and the like. Here, as in the link drive mechanism of FIGS. 1, 2 and 3, the slide velocity may also be reduced to approximately one-half the velocity of a conventional slider crank so that it is possible to double the speed or strokes per minute rate of the press. For the same SPM rate, the reduced slide velocity of the link drive mechanism would result in much less impact noise generated from the tooling.

In the drive capacity diagram of FIG. 9 of the modified link drive mechanism of FIGS. 1, 2 and 3A, plotting drive capacity in tons against distance up on stroke in inches, solid curve 56 depicts the tonnage capacity of the modified link drive mechanism. Here the requirement is that the tonnage capacity require 300 tons of force through the bottom one inch of the slide stroke. Standard rating of mechanical presses is expressed in tonnage capacity at a specified distance from the bottom of the stroke and this distance is generally specified as ½ inch from bottom for general purpose straight side presses. It is noted that to meet the requirement of 300 tons through the bottom one inch of stroke, a conventional slider crank press would require substantially 600 tons at a distance of ½ inch from the bottom. This indicates that oversize slider crank drive is needed for this particular application. However, solid curve 56 for the modified link drive mechanism of this invention requires only a press of 300 ton capacity to provide 300 tons of force through the bottom one inch of the slide stroke, the 300 tons being applied between points 52 and 53 of the curve 56 with some excess tonnage being applied thereafter and being available as indicated by the dotted curve 58 betweem the points 52 and 53.

A comparison of FIGS. 3A, 7, 8 and 9 with FIGS. 3, 4, 5 and 6 clearly illustrates the different work performing functions and characteristics of the modified link drive mechanism as compared to the unmodified link drive mechanism. By appropriate modification of the geometry of the link drive mechanism substantially any desired work performing functions and characteristics may be obtained.

In FIG. 10, a further form of the link drive mechanism of this invention is diagrammatically illustrated, wherein the link drive mechanism comprises a multiple geared, multiple drive mechanism utilizing a plurality of link drive mechanisms. In this respect a double geared, twin drive mechanism utilizing a pair of link drive mechanisms is generally designated at 10A. It includes a first link drive mechanism corresponding to the link drive mechanism of FIG. 1 (with like reference characters being utilized) and a second link drive mechanism like that of FIG. 1 (with like reference characters having an A being utilized). The two link drive mechanisms are arranged within a crown 11 and they are connected to the slide 12 at spaced apart points by the saddles and wrist pins 13, 14 and 13A, 14A. Thus, there is a two point or twin drive of the slide.

Here, the pinion 22 of the drive shaft 20, controlled by the fly wheel 19 and clutch mechanism and the brake 21, meshes with a gear 60A which, in turn, meshes with a gear 60. The gear 60 has a pinion 61 meshing with the gear 25 of the first link drive mechanism and the gear 60A has a pinion 61A meshing with the gear 25A of the second link drive mechanism. Thus, as the drive shaft 20 is rotated, the first and second link drive mechanism operate simultaneously to lower and raise the slide 12 to produce the work performing functions as outlined above.

If a four-geared, four-point drive mechanism utilizing four link drive mechanisms for vertically moving the slide is desired, the form of the invention illustrated in FIG. 10 may be duplicated with four connections to the slide.

While for purposes of illustration, several forms of the invention have been disclosed, other forms thereof may become apparent to those skilled in the art and, accordingly, this invention is to be limited only by the scope of the appended claims.

We claim:

1. In a mechanical press having a bed, a crown and a slide vertically movable therebetween for performing a work function on a work piece supported by the bed and having a connecting means for vertically moving the slide, a link drive mechanism in the crown connected to the connecting means of the slide for vertically moving the slide and comprising, a power driven eccentric unit carried by a horizontal shaft arranged substantially vertically above the connecting means of the slide and having a first eccentric arranged substantially vertically above the connecting means of the slide and a second eccentric adjacent thereto, a first eccentric strap carried by the first eccentric and extending downwardly therefrom and having a first pivot connection and a second pivot connection laterally spaced from the first pivot connection, a first link pivotally connected at one end thereof to the first pivot connection of the first eccentric strap and at the other end thereof to the connecting means of the slide, a second eccentric strap carried by the second eccentric and extending laterally therefrom and having a pivot connection, a substantially vertically extending fulcrum lever arranged laterally from the horizontal shaft and pivoted intermediate its ends on a stationary pivot and having one of its arms pivotally connected to the pivot connection of the second eccentric strap, and a second link extending laterally and pivotally connected at one end thereof to the other arm of the fulcrum lever and at the other end thereof to the second pivot connection of the first eccentric strap, said second eccentric, second eccentric strap, fulcrum lever and second link providing primarily horizontal movement to the first eccentric strap and the first pivot connection thereof, and said first eccentric and first eccentric strap providing primarily vertical movement to the first pivot connection of the first eccentric strap, to substantially align the first pivot connection of the first eccentric strap with the horizontal shaft and the slide connecting means during the work function performing portions of the downward working stroke of the slide, and to produce, during the work function performing portions of the downward working stroke of the slide, controlled slide positions, slide velocity and tonnage capacity of the press.

2. In a mechanical press as defined in claim 1 wherein the positions of the eccentric unit and the pivot of the fulcrum lever, the throw of the first and second eccentrics and the angles thereof, the lengths of the first and second eccentric straps, the lengths of the arms of the fulcrum lever and the lengths of the first and second links control the slide positions, slide velocity and tonnage capacity of the press to provided rated tonnage capacity of the press to the work piece at desired distances up from the dead bottom of the slide during the downward working stroke of the slide for producing desired work functions on the work piece.

3. In a mechanical press as defined in claim 1 wherein the slide positions, slide velocity and tonnage capacity of the press are controlled to provide rated tonnage capacity of the press to the work piece at a substantial distance up from the dead bottom of the slide during the downward working stroke of the slide.

4. In a mechanical press as defined in claim 1 wherein the slide positions, slide velocity and tonnage capacity of the press are controlled to provide rated tonnage capacity of the press to the work piece substantially adjacent the dead bottom of the slide during the downward working stroke of the slide.

5. In a mechanical press as defined in claim 1 wherein the link drive mechanism is a single geared, single drive mechanism for vertically moving the slide.

6. In a mechanical press as defined in claim 1 wherein the link drive mechanism is a multiple geared, multiple drive mechanism utilizing a plurality of link drive mechanisms for vertically moving the slide.

7. In a mechanical press as defined in claim 1 wherein the link drive mechanism is a double geared, twin drive mechanism utilizing a pair of link drive mechanisms for vertically moving the slide.

8. In a mechanical press as defined in claim 1 wherein the link drive mechanism is a four geared, four point drive mechanism utilizing four link drive mechanisms for vertically moving the slide.

9. In a mechanical press as defined in claim 1 wherein the power driven eccentric unit also has a driving gear for rotating the same, and wherein a drive shaft has a driven pinion for rotating the driving gear as the drive shaft is rotated.

10. In a mechanical press as defined in claim 9 wherein a power driven flywheel and clutch mechanism and a brake mechanism are associated with the drive shaft for controlling the rotation of the same.

11. In a mechanical press as defined in claim 9 wherein the power driven eccentric unit carried by the horizontal shaft is an integral one piece unit including the first and second eccentrics and the driving gear.

12. In a mechanical press as defined in claim 11 wherein the power driven eccentric unit is keyed to the horizontal shaft and the horizontal shaft is journaled for rotation in the crown.

13. In a mechanical press as defined in claim 1 wherein the power driven eccentric unit is keyed to the horizontal shaft and the horizontal shaft is journaled for rotation in the crown.

* * * * *